US007657779B2

(12) United States Patent
Kaminsky et al.

(10) Patent No.: US 7,657,779 B2
(45) Date of Patent: Feb. 2, 2010

(54) CLIENT ASSISTED AUTONOMIC COMPUTING

(75) Inventors: David L. Kaminsky, Chapel Hill, NC (US); David M. Ogle, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1233 days.

(21) Appl. No.: 10/246,902

(22) Filed: Sep. 18, 2002

(65) Prior Publication Data

US 2004/0078622 A1 Apr. 22, 2004

(51) Int. Cl.
*G06F 11/00* (2006.01)
(52) U.S. Cl. ............... 714/4; 714/7; 714/13; 714/18
(58) Field of Classification Search ............ 714/4, 714/7, 13, 18, 43; 370/242
See application file for complete search history.

(56) References Cited

U.S. PATENT DOCUMENTS

| 5,771,343 | A  | * | 6/1998  | Hafner et al. ............... 714/4   |
| 5,845,061 | A  | * | 12/1998 | Miyamoto et al. ........... 714/4   |
| 6,145,094 | A  |   | 11/2000 | Shirriff et al.                      |
| 6,640,312 | B1 | * | 10/2003 | Thomson et al. ............ 714/5   |
| 6,769,027 | B1 | * | 7/2004  | Gebhardt et al. ........... 709/228 |
| 6,826,707 | B1 | * | 11/2004 | Stevens ..................... 714/2   |
| 6,874,106 | B2 | * | 3/2005  | Suzuyama et al. .......... 714/57   |
| 2003/0005350 | A1 | * | 1/2003 | Koning et al. ............... 714/4   |

FOREIGN PATENT DOCUMENTS

JP        2002-92052 A        3/2000

OTHER PUBLICATIONS

*Autonomic Computing: IBM's Perspective on the State of Information Technology*, IBM Corp., (Oct. 2001).
M. Behar, Computer, Heal Thyself, *Business2.0*, <http://www.business2.com/articles/mag/print/0,1653,41511,00.html> (Jul. 2002).
Autonomic Computing—A Grand Challenge, *EvoWeb*, <http://evonet.dcs.napier.ac.uk/evoweb/news_events/news_features/nf_article165.html>, (Nov. 9, 2001).
A. G. Ganek, *Autonomic Computing Self-Managing I/T Infrastructure*, IBM Corp.
K. Appleby, et al., Océano—SLA Based Management of a Computing Utility, *IEEE*, (2001).

* cited by examiner

*Primary Examiner*—Robert Beausoliel
*Assistant Examiner*—Joseph D Manoskey
(74) *Attorney, Agent, or Firm*—Jeanine Ray-Yarletts, Esq.; Steven M. Greenberg, Esq.; Carey, Rodriguez, Greenberg & Paul, LLP

(57) ABSTRACT

A method, system and apparatus for server failure diagnosis and self-healing in a server farm. An autonomic server farm which has been configured in accordance with the inventive arrangements can include a multiplicity of servers enabled to respond to requests received from clients which are external to the server farm. A resource director such as an IP sprayer or a network dispatcher can be configured to route requests to selected ones of the servers, in accordance with resource allocation algorithms such as random, round-robin and least recently used. Significantly, unlike conventional server farms whose management of failure diagnosis and self-healing relies exclusively upon the capabilities of the resource director, in the present invention, client-assisted failure detection logic can be coupled to the resource director so as to provide client-assisted management of failure diagnosis and self-healing.

19 Claims, 2 Drawing Sheets

CLIENT ASSISTED AUTONOMIC COMPUTING

BACKGROUND OF THE INVENTION

1. Statement of the Technical Field

The present invention relates to the field of autonomic computing and more particularly to the self-healing of a server farm.

2. Description of the Related Art

Beginning with the advent of enterprise computing, the complexity of computing technology has increased exponentially in pace with the increasing number innovative technologies available for deployment in the enterprise. The revered Moore's Law has driven tremendous growth in the information technology sector and has been seen as the cornerstone of technological advancement. Still, those at the forefront of deploying and managing new computing technologies have recognized that with the increasing number and complexity of computing technologies comes a price: technology management.

That is to say, the principal aim of interoperability has become increasingly more difficult to attain given the requirement that each component in the enterprise must be monitored and managed. Where in the past the enterprise had previously consisted but of a few, standardized components, presently, the enterprise can include a vast number of disparate components, each able to perform magnificently within specified operational parameters, or dismally outside specified operational parameters. Thus, while it may seem to the lay person that future challenges lie with the development of many new technologies having even more capabilities, one skilled in the art will recognize that the true, future challenge lies squarely within the management of technologies which likely already exist.

In the famed manifesto, *Autonomic Computing: IBM's Perspective on the State of Information Technology*, Paul Horn, Senior Vice President of IBM Research, observed, "It's not about keeping pace with Moore's Law, but rather dealing with the consequences of its decades-long reign." Given this observation, Horn suggested a computing parallel to the autonomic nervous system of the biological sciences. Namely, whereas the autonomic nervous system of a human being monitors, regulates, repairs and responds to changing conditions without any conscious effort on the part of the human being, in an autonomic computing system, the system must self-regulate, self-repair and respond to changing conditions, without requiring any conscious effort on the part of the computing system operator.

Thus, while the autonomic nervous system can relieve the human being from the burden of coping with complexity, so too can an autonomic computing system. Rather, the computing system itself can bear the responsibility of coping with its own complexity. The crux of the IBM manifesto relates to eight principal characteristics of an autonomic computing system:

I. The system must "know itself" and include those system components which also possess a system identify.
II. The system must be able to configure and reconfigure itself under varying and unpredictable conditions.
III. The system must never settle for the status quo and the system must always look for ways to optimize its workings.
IV. The system must be self-healing and capable of recovering from routine and extraordinary events that might cause some of its parts to malfunction.
V. The system must be an expert in self-protection.
VI. The system must know its environment and the context surrounding its activity, and act accordingly.
VII. The system must adhere to open standards.
VIII. The system must anticipate the optimized resources needed while keeping its complexity hidden from the user.

Notably, in accordance with the eight tenants of autonomic computing, several single system and peer-to-peer systems have been proposed in which self-configuration, management and healing have provided a foundation for autonomic operation. Yet, despite the eight tenants of autonomic computing, no existing implementation has addressed the interaction of client computing devices with server processes in a server farm so as to promote self-management and self-healing within the server farm. Rather, most server farms rely upon the use either of a periodic hear-beat mechanism, or the use of a "sprayer" in monitoring the health of servers in the server farm at the time the sprayer assigns a server to handle an incoming request.

SUMMARY OF THE INVENTION

The present invention is a method, system and apparatus for server failure diagnosis and self-healing in a server farm. Specifically, the present invention can enable the autonomic configuration of a server farm. An autonomic server farm which has been configured in accordance with the inventive arrangements can include a multiplicity of servers enabled to respond to requests received from clients which are external to the server farm. A resource director such as an IP sprayer or a network dispatcher can be configured to route requests to selected ones of the servers, in accordance with resource allocation algorithms such as random, round-robin and least recently used. Significantly, unlike conventional server farms whose management of failure diagnosis and self-healing relies exclusively upon the capabilities of the resource director, in the present invention, client-assisted failure detection logic can be coupled to the resource director so as to provide client-assisted management of failure diagnosis and self-healing.

A method of server failure diagnosis and self-healing in a server farm can include receiving a retry request from a client while attempting to engage in a communicative request/response session with an assigned server in the server farm. An occurrence of a failure in the assigned server can be determined from the retry request. In consequence, a different server in the server farm can be assigned to process the retry request. Importantly, operations for remediating the failure in the assigned server can be performed as well.

In one aspect of the invention, the determining step can include locating in a request string associated with the retry request an indication of the occurrence of the failure in the assigned server. Alternatively, the determining step can include locating in a cookie associated with the retry request an indication of the occurrence of the failure in the assigned server. Finally, the performing step can include performing at least one remedial operation selected from the group consisting of recycling the initial server, restarting a device in the initial server, and restarting an application in the initial server. Optionally, the performing step can include notifying an administrative node of the failure.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a process, system and apparatus for client-assisted diagnosis and self-healing in a server farm. Specifically, in accordance with the inventive arrangements, individual client computing devices can request services, including data, from one or more servers in a server farm. For each request received from an individual client computing device, a network dispatching process, for instance a sprayer, can route the request to an available server in the server farm with which the requesting client and assigned server can establish a communicative session.

In those circumstances where an assigned server fails to respond to a requesting client in the course of a communicative session, the requesting client can retry the request along with an indication that the assigned server has failed to respond to a request. The indication can include, for example, a direct reference to the failed server, or a correlator from which the network dispatcher can resolve the identity of the failed server. The network dispatching process, upon receiving the retry, can again route the request to another server in the server farm. Additionally, the network dispatching process can undertake remedial action in the failing server, for example recycling the server, restarting a particular application or process in the server, and notifying the server farm administrator.

In this way, client computing devices which interact with servers in the server farm can monitor the responsiveness of the servers in the server farm with a degree of granularity not previously possible using diagnostic tools implemented within the network dispatcher. That is to say, while the network dispatcher alone can only monitor the success of a communicative session at the time of the routing the initial request to a particular server in the sever farm, in the present invention, the success of a communicative session can be monitored during the course of each request between a communicatively coupled client and server. Thus, the use of the present invention can facilitate an autonomic computing configuration in the server farm.

Figure 1:
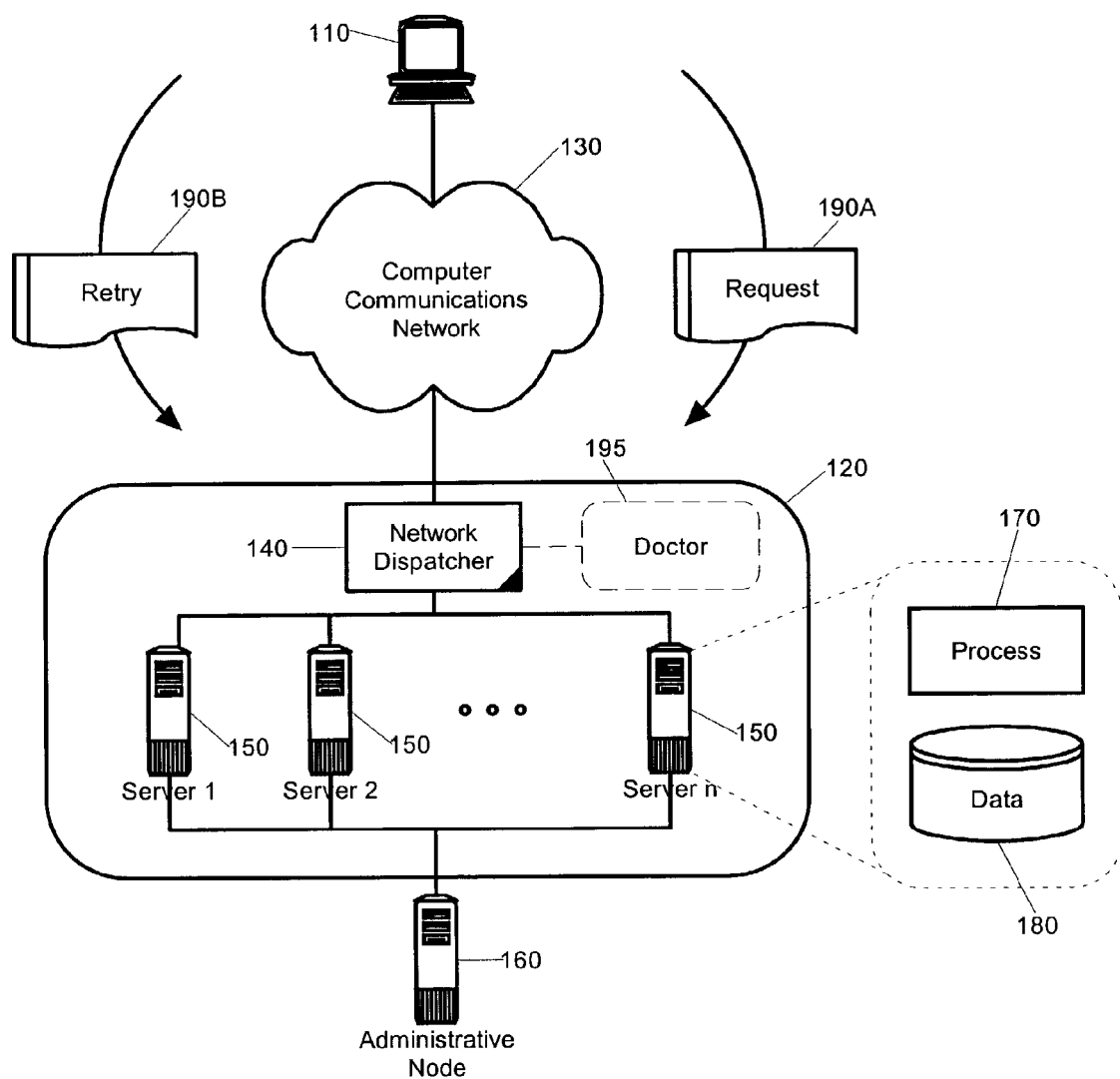
FIG. 1 is a block diagram of a server farm which has been configured for client-assisted diagnosis and self-healing in accordance with the inventive arrangements; and, FIG. 2 is a timing diagram illustrating a process for client-assisted diagnosis and self-healing in a server farm.

FIG. 1 is a block diagram of a server farm which has been configured for client-assisted diagnosis and self-healing in accordance with the inventive arrangements. The server farm 120 can include one or more servers 150, each server 150 hosting one more computing processes 170 and associated data 180. A network dispatcher 140 can be configured to receive incoming requests from one or more clients 110 over the computer communications network 130. The network dispatcher 140 can route such incoming requests to selected ones of the servers 150 according to well-known load-balancing algorithms such as round-robin, or random server selection. Optionally, an administrative node 160 can be provided through which the configuration of the server farm 120 can be managed.

In operation, a communicative session can be established between an individual client 110 and a server 150 in the server farm 120. Specifically, upon receiving an initial request from the individual client 110, the network dispatcher, for example a front-end IP sprayer, a resource director or other such network device, can route an initial request to a selected one of the servers 150 in the server farm 120 according to any load-balancing or other server selection algorithm, such as a random selection, a least recently used, or a round robin selection. Based upon the assignment of the selected one of the servers 150, a communicative session can be established between the client 110 and the selected one of the servers 150 during which course session affinity can be maintained between client 110 and the selected one of the servers 150.

In the course of the communicative coupling of client 110 and the selected one of the servers 150, request/response transactions can occur. Ordinarily, where the selected one of the servers 150 can respond to requests from the client 110 in a suitable fashion, session affinity can be maintained. However, where the selected one of the servers 150 fails to respond to a request 190A, even where the failure occurs during an initial request to establish a session, the client 110 can attempt a retry 190B. Significantly, along with the retry request 190B, the client 110 can identify the selected one of the servers 150 as having failed to respond to the request 190A. Specifically, the identity of the selected one of the servers 150 can be included, for example as a cookie or within the retry request string.

In any case, upon detecting the retry request 190B, the network dispatcher 140 can assign a new one of the servers 150 to respond to the retry request 190B. More importantly, the new one of the servers 150 can undertake remedial measures in the selected one of the servers 150. Alternatively, an optionally affiliated doctor process 195, whether located in the same node as the network dispatcher 140, or within another node, can undertake remedial measures. Such remedial measures can include, for instance, the recycling of the selected one of the servers 150, the restarting of a particular application or process in the selected one of the servers 150, and the notification of the administrative node 160.

Importantly, the invention neither is limited strictly to the reporting of the response failure at the outset of any one time-out condition, nor is the invention limited strictly to the determination that a failure has occurred exclusively by virtue of a time-out condition in a server. Rather, in respect to when a failure in a server is identified, the requesting client can re-attempt the subject request multiple times before determining that a failure has occurred. Moreover, the client can declare that a failure has occurred through the inspection of a defective response which otherwise can indicate a failure in the server, for instance, an HTTP 4xx notification.

More specifically, the network dispatcher 140 can handle multiple classes of server failure. For example, the network dispatcher 140 can handle the circumstance where the request 190A sent by the client 110 does not reach the assigned server 150. Also, the network dispatcher 140 can handle the circumstance where the assigned server 150 fails to produce a result. The network dispatcher 140 further can handle the circumstance where the result, while produced by the assigned server 150, does not reach the client 110. In all cases, it will be apparent to one skilled in the art that the network dispatcher 140 can handle all failure states arising from the failure to complete a request/response transaction between the client 110 and an assigned server 150.

Figure 2:
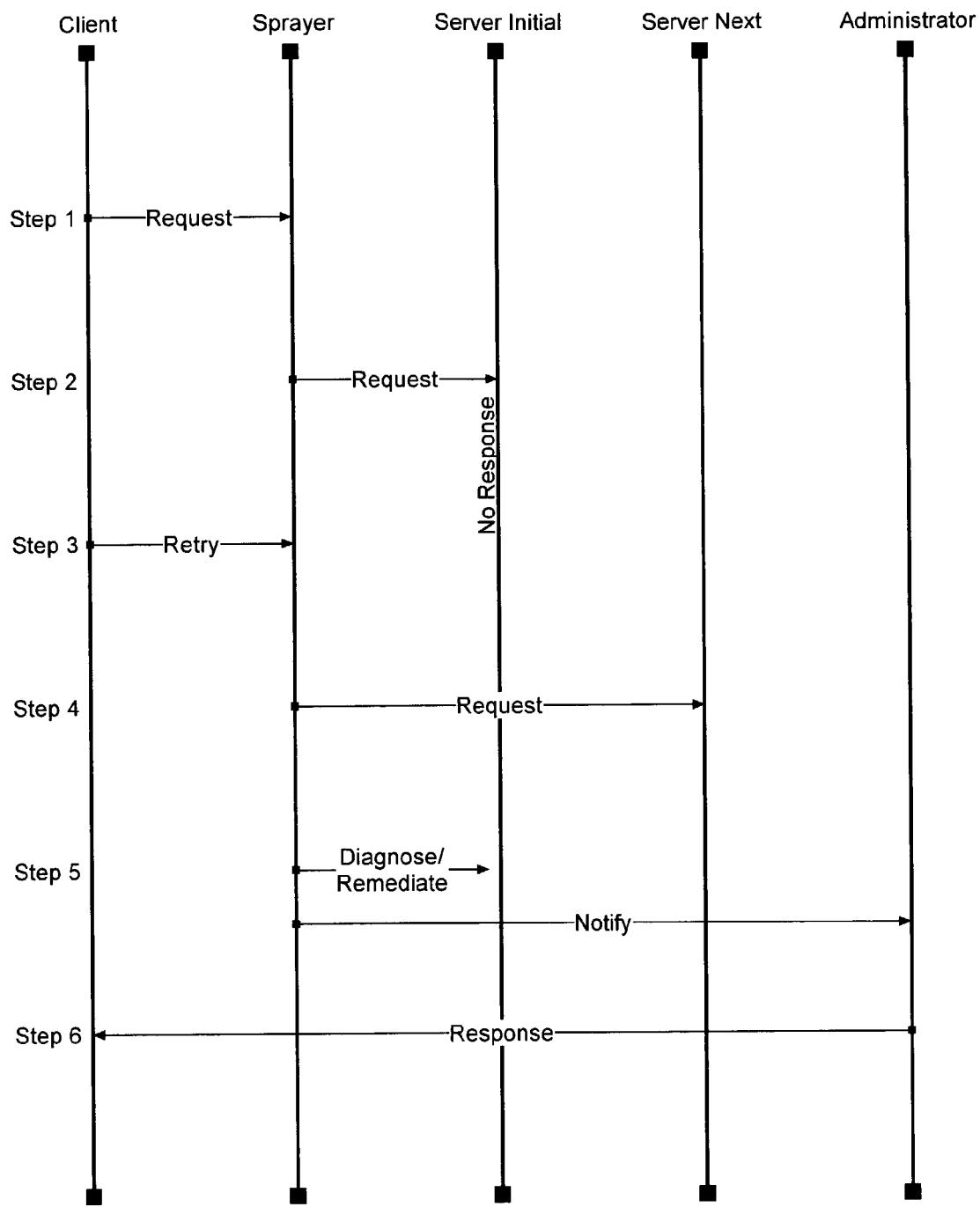

FIG. 2 is a timing diagram illustrating a process for client-assisted diagnosis and self-healing in a server farm. Beginning in step 1, the client can forward a request to a sprayer. The sprayer can route the request in step 2 to an initially assigned server in the server farm. To the extent that the initially assigned server either fails to respond after one or more attempts, or where the server responds with an error notice, or where a failure can be detected from the response, in step 3, the client can attempt a retry which can include an indication that the initially assigned server has failed to respond to the request.

In step 4, the sprayer or optionally, a doctor process, recognizing a need to assign a new server in the server farm to handle the requests of the client, can assign a next server in the server farm to handle subsequent requests from the client, including the retry request. Notably, the next server can be assigned according to any resource management or load balancing algorithm, such as round-robin, random or least recently used. In any case, in step 5, having identified a failure in the initially assigned server, the sprayer, or doctor as the case may be, can further diagnose the status of the initially assigned server.

Importantly, the sprayer or doctor process can identify different classes of server failure using several methods, each whose use can depend upon the class of error. For example, where the server has failed to respond to a request, or where the response has not been received by the client, traditional IP tools such as ping and traceroute can be used to diagnose the server failure. By comparison, where the server has received the request, but has not produced a result, the doctor can inject diagnosis transactions into the suspect server, or the doctor can request that the client inject diagnosis transactions into the suspect server. Subsequently, the doctor can monitor the result.

In the circumstance where the sprayer or the optional doctor process can definitively identify a failure, the sprayer can undertake remedial measures, such as recycling the initially assigned server, or restarting an application or process in the initially assigned server. Also, the sprayer can notify the administrator of the server farm of the detected failure. Finally, in step 6, presuming that the next server has not failed, the next server in the server farm can respond to the retry request of the client and subsequent requests issued by the client.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of server failure diagnosis and self-healing in a server farm comprising a plurality of separately assignable servers, comprising the steps of:
   receiving a retry request from a client attempting to engage in a communicative request/response session with an assigned server from said plurality of separately assignable servers in the server farm;
   determining from said retry request received from the client, an occurrence of a failure in said assigned server; and
   performing operations for remediating said failure in said assigned server, wherein
   said determining step comprises indentifying an indicator associated with said retry request, said indicator indicating said occurrence of said failure in said assigned servers.

2. The method of claim 1, wherein said performing step comprises the step of performing at least one remedial operation selected from the group consisting of recycling said assigned server having said failure, restarting a device in said assigned server having said failure, and restarting an application in said assigned server having said failure.

3. The method of claim 1, wherein said performing step further comprises the step of notifying an administrative node of said failure.

4. The method of claim 1, wherein said performing step comprises the steps of:
   diagnosing said failure; and,
   performing at least one remedial operation based upon said diagnosis wherein said remedial operation is selected from the group consisting of recycling said assigned server having said failure, restarting a device in said assigned server having said failure, and restarting an application in said assigned server having said failure.

5. The method of claim 4, wherein said diagnosing step comprises the steps of:
   pinging said assigned server having said failure; and,
   performing a traceroute between said assigned server having said failure and said client.

6. The method of claim 4, wherein said diagnosing step comprises the steps of:
   injecting a test transaction into said assigned server having said failure; and,
   monitoring a result produced by said injection.

7. The method of claim 6, wherein said injecting step comprises the step of inducing said client to inject a test transaction into said assigned server having said failure.

8. A method of server failure diagnosis and self-healing in a server farm, comprising the steps of:
   receiving a retry request from client attempting to engage in a communicative request/response session with an assigned server in the server farm;
   determining from said retry request, an occurrence of a failure in said assigned server; and,
   performing operations to said assigned server for remediating said failure in said assigned server, wherein said determining step comprises the step of locating in a request string associated with said retry request an indication of said occurrence of said failure in said assigned server.

9. A method of server failure diagnosis and self-healing in a server farm, comprising the steps of:
   receiving a retry request from client attempting to engage in a communicative request/response session with an assigned server in the server farm;

determining from said retry request, an occurrence of a failure in said assigned server; and, performing operations to said assigned server for remediating said failure in said assigned server, wherein said determining step comprises the step of locating in a cookie associated with said retry request an indication of said occurrence of said failure in said assigned server.

10. An autonomic server farm comprising:

a plurality of separately assignable servers configured to respond to requests received from clients which are external to the server farm;

a resource director configured to route requests to an assigned first one of said servers;

client-assisted failure detection logic coupled to said resource director to determine an occurrence of a failure in said assigned first one of said servers; and a doctor communicatively coupled to said resource director and configured to perform an operation to said assigned first one of said servers for remediating said failure in said assigned first one of said servers, wherein responsive to determining the occurrence of the failure in said assigned first one of said server, assigning a second one of said servers to process a retry request received from said clients, the assigned second one of said servers different than the assigned first one of said servers server having said failure, and said failure detection logic identifying an indicator associated with said retry request, said indicator indicating said occurrence of said failure in said assigned first one of said server.

11. A computer readable storage having stored thereon a computer program for performing server failure diagnosis and self healing in a server farm comprising a plurality of separately assignable servers, said computer program comprising a routine set of instructions which when executed cause a computer to perform the steps of:

receiving a retry request from a client attempting to engage in a communicative request/response session with an assigned server from said plurality of separately assignable servers in the server farm;

determining from said retry request received from the client, an occurrence of a failure in said assigned server; and performing operations for remediating said failure in said assigned server, wherein said determining step comprises indentifying an indicator associated with said retry request, said indicator indicating said occurrence of said failure in said assigned server.

12. The computer readable storage of claim 11, wherein said performing step comprises the step of performing at least one remedial operation selected from the group consisting of recycling said assigned server having said failure, restarting a device in said assigned server having said failure, and restarting an application in said assigned server having said failure.

13. The computer readable storage of claim 11, wherein said performing step further comprises the step of notifying an administrative node of said failure.

14. The computer readable storage of claim 11, wherein said performing step comprises the steps of:

diagnosing said failure; and, performing at least one remedial operation based upon said diagnosis wherein said remedial operation is selected from the group consisting of recycling said assigned server having said failure, restarting a device in said assigned server having said failure, and restarting an application in said assigned server having said failure.

15. The computer readable storage of claim 14, wherein said diagnosing step comprises the steps of:

pinging said assigned server having said failure; and, performing a traceroute between said assigned server having said failure and said client.

16. The computer readable storage of claim 14, wherein said diagnosing step comprises the steps of:

injecting a test transaction into said assigned server having said failure; and, monitoring a result produced by said injection.

17. The computer readable storage of claim 16, wherein said injecting step comprises the step of inducing said client to inject a test transaction into said assigned server having said failure.

18. A computer readable storage having stored thereon a computer program for performing server failure diagnosis and self healing in a server farm, said computer program comprising a routine set of instructions which when executed cause a computer to perform the steps of:

receiving a retry request from client attempting to engage in a communicative request/response session with an assigned server in the server farm;

determining from said retry request, an occurrence of a failure in said assigned server; and, performing operations to said assigned server for remediating said failure in said assigned server, wherein said determining step comprises the step of locating in a request string associated with said retry request an indication of said occurrence of said failure in said assigned server.

19. A computer readable storage having stored thereon a computer program for performing server failure diagnosis and self-healing in a server farm, said computer program comprising a routine set of instructions which when executed cause a computer to perform the steps of:

receiving a retry request from client attempting to engage in a communicative request/response session with an assigned server in the server farm;

determining from said retry request, an occurrence of a failure in said assigned server; and, performing operations to said assigned server for remediating said failure in said assigned server, wherein said determining step comprises the step of locating in a cookie associated with said retry request an indication of said occurrence of said failure in said assigned server.

* * * * *